United States Patent
Oh (10) Patent No.: US 10,082,897 B2
(45) Date of Patent: Sep. 25, 2018

(54) DOUBLE-SIDED TOUCH PANEL DISPLAY DEVICE AND MANUFACTURING METHOD

(71) Applicant: Samsung Display Co., Ltd., Yongin-si (KR)

(72) Inventor: Jeong-Seok Oh, Seoul (KR)

(73) Assignee: Samsung Display Co., Ltd, Yongin-si (KR)

(*) Notice: Subject to any disclaimer, the term of this patent is extended or adjusted under 35 U.S.C. 154(b) by 0 days.

(21) Appl. No.: 15/692,549

(22) Filed: Aug. 31, 2017

(65) Prior Publication Data

US 2017/0364186 A1 Dec. 21, 2017

Related U.S. Application Data

(62) Division of application No. 14/605,075, filed on Jan. 26, 2015, now Pat. No. 9,772,705.

(30) Foreign Application Priority Data

Aug. 13, 2014 (KR) ........................ 10-2014-0104850

(51) Int. Cl.
*G06F 3/041* (2006.01)

(52) U.S. Cl.
CPC .. *G06F 3/0412* (2013.01); *G06F 2203/04103* (2013.01)

(58) Field of Classification Search
CPC ..................... G06F 3/0412; G06F 2203/04103
See application file for complete search history.

(56) References Cited

U.S. PATENT DOCUMENTS

| | | |
|---|---|---|
| 5,929,951 A | 7/1999 | Sasakura et al. |
| 6,570,707 B1 | 5/2003 | Murakami et al. |
| 2005/0052348 A1 | 3/2005 | Yamazaki et al. |
| 2007/0052879 A1* | 3/2007 | Uehara ................. G02F 1/1323 349/56 |
| 2010/0277439 A1 | 11/2010 | Charlier et al. |
| 2012/0032917 A1 | 2/2012 | Yamaguchi |
| 2012/0099049 A1* | 4/2012 | Yamazaki ......... G02F 1/133603 349/64 |
| 2013/0021289 A1 | 1/2013 | Chen et al. |
| 2013/0044074 A1 | 2/2013 | Park et al. |

(Continued)

FOREIGN PATENT DOCUMENTS

| | | |
|---|---|---|
| KR | 10-2012-0018132 | 2/2012 |
| KR | 10-2013-0068096 | 6/2013 |

(Continued)

OTHER PUBLICATIONS

Non-Final Office Action dated Jul. 12, 2016, in U.S. Appl. No. 14/605,075.

(Continued)

*Primary Examiner* — Liliana Cerullo
(74) *Attorney, Agent, or Firm* — H.C. Park & Associates, PLC (57) ABSTRACT

A display device includes a first transparent substrate, a second transparent substrate opposed to the first transparent substrate, a display panel disposed between the first transparent substrate and the second transparent substrate, a first touch panel disposed on a bottom face of the display panel, and a second touch panel disposed on an upper face of the display panel.

8 Claims, 7 Drawing Sheets

(56) References Cited

U.S. PATENT DOCUMENTS

2013/0154977 A1   6/2013  Lee et al.
2013/0241869 A1   9/2013  Kida et al.

FOREIGN PATENT DOCUMENTS

KR   10-2014-0002224   1/2014
KR   10-20140-041949   4/2014

OTHER PUBLICATIONS

Final Office Action dated Oct. 26, 2016, in U.S. Appl. No. 14/605,075.
Advisory Action dated Dec. 12, 2016, in U.S. Appl. No. 14/605,075.
Non-Final Office Action dated Feb. 16, 2017, in U.S. Appl. No. 14/605,075.
Notice of Allowance dated May 31, 2017, in U.S. Appl. No. 14/605,075.

* cited by examiner

DOUBLE-SIDED TOUCH PANEL DISPLAY DEVICE AND MANUFACTURING METHOD

CROSS REFERENCE TO RELATED APPLICATION

This application is a Divisional of U.S. patent application Ser. No. 14/605,075, filed on Jan. 26, 2015, and claims priority from and the benefit of Korean patent Application No. 10-2014-0104850, filed on Aug. 13, 2014, the disclosures of which are hereby incorporated by reference herein in their entirety.

BACKGROUND

Field

Exemplary embodiments of the present invention relate to display devices and methods of manufacturing display devices. More particularly, exemplary embodiments of the present invention relate to display devices including a plurality of touch panels and methods of manufacturing the display devices.

Discussion of the Background

Generally, a display device may include a rear cover, a display panel, a touch screen panel, a front cover, etc. The touch screen panel may detect a touch position input by, for example, a user (e.g., a finger) and/or an object (e.g., a stylus). In the detecting the touch position, the touch screen panel may convert a contact signal of the user and/or object into an electric signal.

However, the conventional display device requires an external touch screen panel, resulting in a conventional display device that may be relatively thick and relatively heavy because of the external touch screen panel attached to the display panel. In addition, the conventional display device usually includes only one external touch screen panel, and thus the conventional display device may display an image on only one side thereof, since one external type touch screen panel is typically included. Furthermore, the touch position may be detected on only one side of the conventional display device because only one external touch screen panel is attached to the display panel.

SUMMARY

Exemplary embodiments of the present invention relate to a display device including a plurality of touch panels in order to obtain several advantages, such as a thinner, lighter display device having a high transmittance, a double-sided display, a double-sided touch panel, and other advantages.

Embodiments also provide a method of manufacturing the display device.

Additional features of the invention will be set forth in the description which follows, and in part will be apparent from the description, or may be learned by practice of the invention.

An exemplary embodiment of the present invention discloses a display device including a first transparent substrate, a second transparent substrate, a display panel, a first touch panel, and a second touch panel. The second transparent substrate may be substantially opposed to the first transparent substrate. The display panel may be disposed between the first transparent substrate and the second transparent substrate. The first touch panel may be disposed on a bottom face of the display panel and between the first and second transparent substrates. The second touch panel may be disposed on an upper face of the display panel and between the first and second transparent substrates.

An exemplary embodiment of the present invention also discloses a method of manufacturing a display device. In the method of manufacturing the display device, a first transparent substrate may be provided, and a display panel may be formed on the first transparent substrate. A first touch panel may be formed beneath on a bottom face of the display panel, and a second touch panel may be formed on an upper face of the display panel. A second transparent substrate may be provided on the second touch panel.

Thus, according to exemplary embodiments of the present invention, the display device may include the plurality of touch panels (i.e., a first touch panel, a second touch panel, etc), so that touch positions by, for example, a hand of a user or a conductive object, may be detected on the lower and the upper faces of the display device. Thus, the display device may serve as a double sided touch display device. Further, the display device may have substantially reduced dimensions (e.g., thickness, weight, etc.) because the first sensing patterns of the first touch panel may be directly disposed on the lower face of the first base substrate, and also, the second sensing patterns of the second touch panel may be directly disposed on the upper face of the second base substrate. Furthermore, since each of components in the display device may have a relatively high transmittance, the display device may serve as a transparent display device without reducing a transmittance thereof.

It is to be understood that both the foregoing general description and the following detailed description are exemplary and explanatory and are intended to provide further explanation of the invention as claimed.

BRIEF DESCRIPTION OF THE DRAWINGS

Illustrative, non-limiting exemplary embodiments will be more clearly understood from the following detailed description taken in conjunction containing the accompanying drawings.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Figure 1:
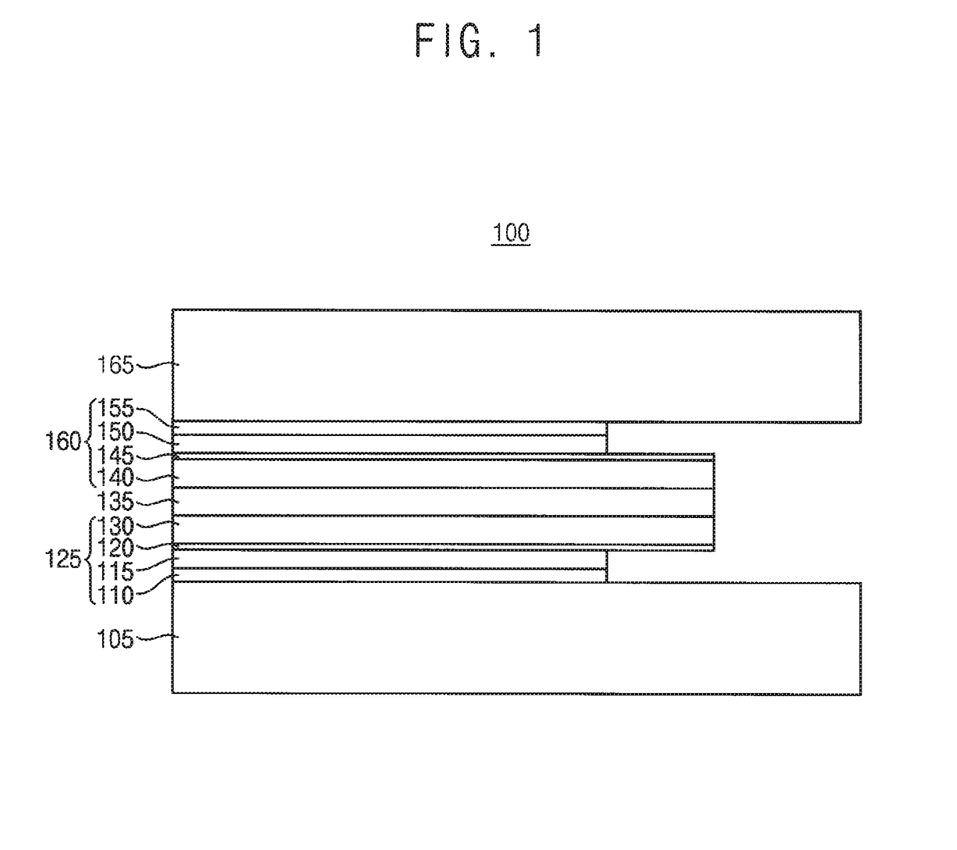
FIG. 1 is a cross-sectional view illustrating a display device in accordance with an exemplary embodiment of the present invention.
Figure 2A:
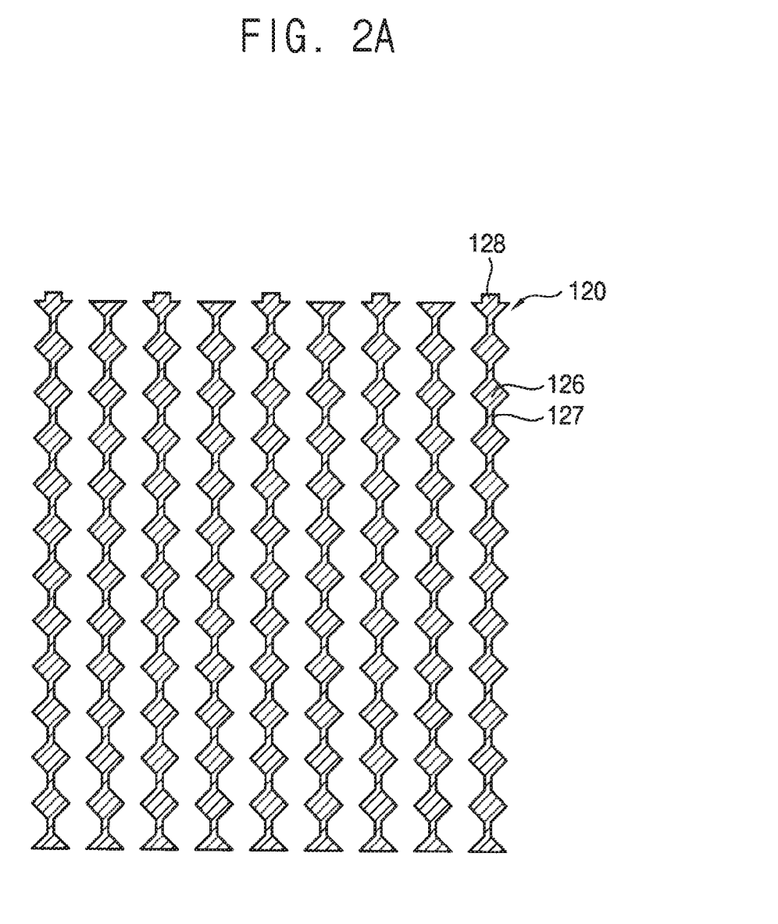
FIG. 2A is an enlarged plan view illustrating a first touch panel of a display device of FIG. 1.
Figure 2B:
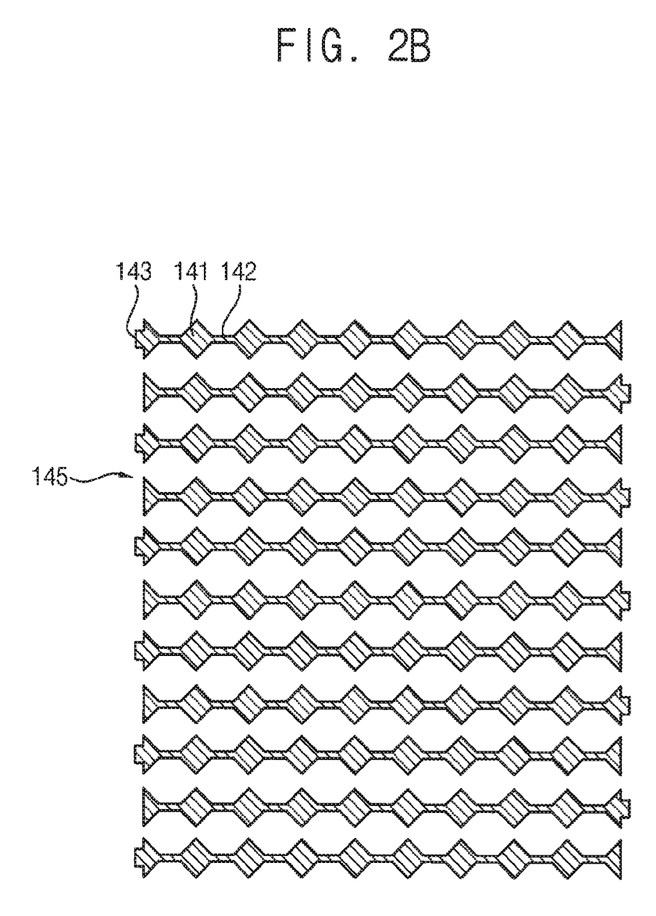
FIG. 2B is an enlarged plan view illustrating a second touch panel of a display device of FIG. 1.

FIG. 1 is a cross-sectional view illustrating a display device in accordance with exemplary embodiments. FIG. 2A is an enlarged plan view illustrating a first touch panel of a display device in FIG. 1. FIG. 2B is an enlarged plan view illustrating a second touch panel of a display device in FIG. 1.

Referring to FIGS. 1, 2A, and 2B, a display device 100 may include a first transparent substrate 105, a first touch panel 125, a display panel 135, a second touch panel 160, and a second transparent substrate 165.

The first transparent substrate 105 may be a glass substrate, a quartz substrate, a transparent resin substrate, etc. The first transparent substrate 105 may serve as a lower window of the display device 100. The first transparent substrate 105 may protect the display panel 135 from an external impact or an external environment without substantially reducing a transmittance of the display device 100.

The first touch panel 125 may be disposed on the first transparent substrate 105. The first touch panel 125 may detect a touch position (i.e., a contact position) through the first transparent substrate 125. For example, the touch position may be input by, for example, a hand of a user and/or a conductive object (e.g., a conductive pen). In exemplary embodiments, the first touch panel 125 may include a first base substrate 130, a plurality of first sensing patterns 120, a first polarization member 115, a first adhesion layer 110, but is not limited thereto and other layering patterns may be used.

The first adhesion layer 110 may be positioned between the first transparent substrate 105 and the first polarization member 115. The first touch panel 125 may be adhered to the first transparent substrate 105 by the first adhesion layer 110. For example, the first adhesion layer 110 may be a transparent optical clear adhesive or a transparent optical clear resin. Thus, the first adhesion layer 110 may absorb or reduce shock from an external impact, so that the first adhesion layer 110 may protect other layers of the display panel 100. In addition, since the first adhesion layer 110 may include the transparent optical clear adhesive or the transparent optical clear resin, the transmittance of the display device 100 may be substantially uniformly maintained.

The first polarization member 115 may be disposed on the first adhesion layer 110. The first polarization member 115 may selectively transmit an incident light through the first transparent substrate 105. Thus, the first polarization member 115 may substantially reduce or prevent reflection from incident external light from outside of the display device 100. For example, the first polarization member 115 may include an iodine-based polarizing film, a dye-based polarizing film, a polyene-based polarizing film, etc.

The plurality of the first sensing patterns 120 may be located between the first polarization member 115 and the first base substrate 130. As illustrated in FIG. 1, the first sensing patterns 120 may be directly disposed on a bottom face of the first base substrate 130. Each of the first sensing patterns 120 may include a transparent conductive material. For example, each first sensing pattern 120 may include indium tin oxide, zinc tin oxide, gallium oxide, indium zinc oxide, zinc oxide, etc. Therefore, the first sensing patterns 120 of the first touch panel 125 may not substantially reduce the transmittance of the display device 100.

As illustrated in FIG. 2A, each of the first sensing patterns 120 may include a plurality of first sensing cells 126, a plurality of first connecting portions 127, and a plurality of first pads 128. Each of the first sensing cells 126 may have a substantially rhombus shape (in plan view), a substantially diamond shape (in plan view), but the shape of first sensing cells 126 are not limited thereto. That is, each first sensing cell 126 may have one of various shapes such as a substantially circular shape, a substantially elliptical shape, a substantially polygonal shape, or other shapes. Adjacent first sensing cells 126 may be connected to each other by a first connecting portion 127 interposed therebetween. In this manner, the plurality of the first cells 126 may be connected to one another by interposing the plurality of the first connecting portions 127 therebetween. The first sensing cells 126 may be regularly arranged on the bottom face of the first base substrate 130. For example, the first connecting portions 127 may connect the first sensing cells 126 which have the same x-axis coordinates or the same y-axis coordinates. The first pads 128 may be connected to the first sensing cells 126 at beginning or end of a column of the first sensing cells 126.

The first sensing patterns 120 may be disposed on the first base substrate 130. In other words, the first base substrate 130 may support the first sensing patterns 120. Further, the first base substrate 130 may serve as an encapsulation substrate that protects the display panel 135. For example, the first base substrate 130 may include a transparent inorganic material such as transparent resin, glass, quartz, etc.

The display panel 135 may be disposed on the first touch panel 125. The display panel 135 may include an insulation substrate (not illustrated), semiconductor devices (not illustrated), display structures (not shown), peripheral circuits (not illustrated), and/or other structures, as would be appreciated by one having skill in the art. The insulation substrate for the display panel 135 may include a glass substrate, a quartz substrate, a transparent resin substrate, etc. The semiconductor devices of the display panel 135 may include thin film transistors, oxide semiconductor devices, etc. Each of the display structures may include an organic light emitting display structure, a liquid crystal display structure, etc. The display structures may be electrically connected to the semiconductor devices, respectively. The peripheral circuits may be disposed on the insulation substrate so as to operate the semiconductor devices and the display structures.

The second touch panel 160 may be disposed on the display panel 135. The second touch panel 160 may include a second base substrate 140, a plurality of second sensing patterns 145, a second polarization member 150, a second adhesion layer 155, but is not limited thereto and other layering patterns may be used.

The second base substrate 140 may be disposed on the display panel 135. The second base substrate 140 may support the second sensing patterns 145. Additionally, the second base substrate 140 may protect the display panel 135 from shock due to an external impact or the external environment without substantially reducing the transmittance of the display device 100. The second base substrate 140 may include a material substantially the same as that of the first base substrate 135. For example, the second base substrate 140 may include transparent resin, glass, quartz, etc.

The second sensing patterns 145 may be directly disposed on an upper face of the second base substrate 140. A touch position (i.e., a contact position) of the second touch panel 160 input by, for example, a finger of the user or the conductive object, may be detected by the second sensing patterns 145 through the second transparent substrate 165. Each of the second sensing patterns 145 may include a material substantially the same as that of each first sensing pattern 120. For example, each second sensing pattern 145 may include indium tin oxide, zinc tin oxide, gallium oxide, indium zinc oxide, zinc oxide, etc. Each of the second sensing patterns 145 may include a material different from that of each first sensing pattern 120.

As illustrated in FIG. 2B, the second sensing patterns 145 may include a plurality of second sensing cells 141, a plurality of second connecting portions 142 and a plurality of second pads 143, respectively. The structure and material of second sensing cells 141 may be substantially the same as or similar to that used in the first sensing cells 126 described above with reference to FIG. 2A. Further, the structure and material of the second connecting portions 142 may be substantially the same as or similar to the first connecting portions 127 described above with reference to FIG. 2A. The structure and material of the second pads 143 may also be substantially the same as or similar to the first pads 128 described above with reference to FIG. 2A.

The second sensing cells 141 may not substantially overlap the first sensing cells 120 illustrated in FIG. 2A. In order words, the second sensing cells 141 may extend along a direction different from a direction in which the first sensing patterns 120 in FIG. 2A extend. Alternatively, the second sensing cells 141 may extend along a direction substantially the same as a direction in which the first sensing patterns 120 in FIG. 2A extend.

The second polarization member 150 may be disposed on the second sensing patterns 145. The second polarization member 150 may include a material substantially the same as that of the first polarization member 115. The second polarization member 150 may have substantially the same characteristics as that of the first polarization member 115.

The second adhesion layer 155 may be disposed on the second polarization member 150 so that the second transparent substrate 165 may be adhered to the second touch panel 160 by the second adhesion layer 155. The second adhesion layer 155 may include a material substantially the same as that of the first adhesion layer 110.

As described above, the first and the second touch panels 125 and 160 of the display device 100, according to exemplary embodiments, may be disposed on the upper face of the display panel 135 and the bottom face of the display panel, respectively. Hence, the display device 100 may serve as a double-sided display device for displaying images on two sides thereof. That is, the display device 100 may display images on both sides of the display device 100. Further, the display device 100 may not include an additional external touch screen panel because the first and the second touch panels 125 and 160 may be disposed on the bottom face and the upper face of the display panel 135, respectively. As a result, the display device 100 may have reduced dimensions, for example, a reduced thickness, a reduced weight, etc.

The second transparent substrate 165 may be disposed on the second polarization member 150. The second transparent substrate 165 may be substantially opposed to the first transparent substrate 105. The second transparent substrate 165 may include a material substantially the same as that of the first transparent substrate 105. For example, the second transparent substrate 165 may include a glass substrate, a quartz substrate, a transparent resin substrate, etc. The second transparent substrate 165 may serve as an upper window of the display device 100.

A conventional display device includes an additional external touch screen panel for detecting a touch position. Thus, the conventional display device may be thicker and heavier in a case in which the external type touch screen panel is attached to a display panel of the conventional display device. In addition, the conventional display device may generally include one external touch screen panel, so that the conventional display device may display an image on only one side of the display device.

In contrast to the conventional display device, the display device 100 according to exemplary embodiments of the present invention may have a configuration in which the first and the second touch panels 125 and 160 may be directly disposed on the bottom face of the display panel 135 and the upper face of the display panel 135, respectively. Therefore, the thickness of the display device 100 may be minimized. Additionally, images may be displayed on the both sides of the display device 100, and the touch positions where the input devices contact the display device 100 may be detected through the both sides of the display device 100. As a result, the display device 100 may have various characteristics, such as a double-sided display and a double-sided touch characteristic without substantially increasing the thickness and the weight of the display device 100. Furthermore, the transmittance of the display device 100 may not be substantially reduced because each of components of the display device 100 may have a relatively high transmittance.

Figure 3:
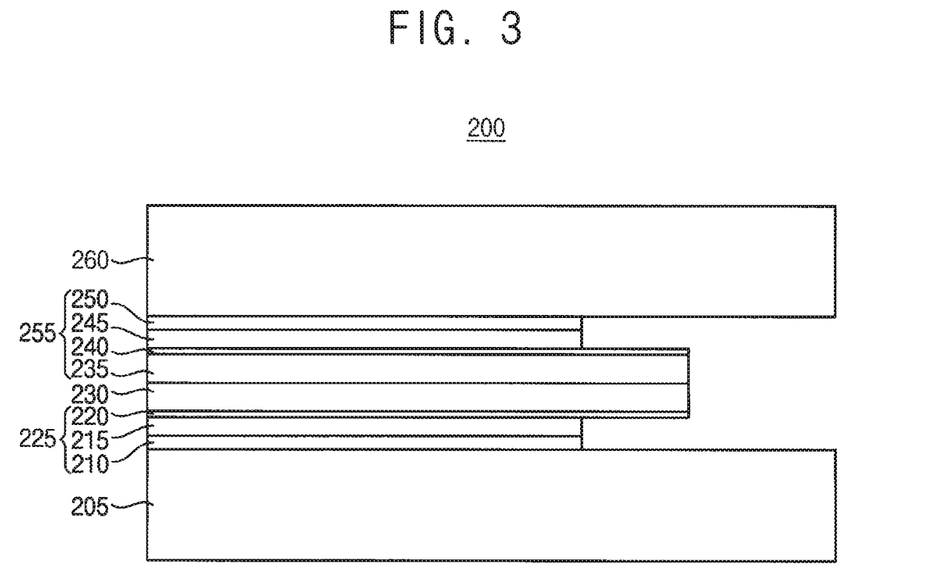
FIG. 3 is a cross-sectional view illustrating a display device in accordance with an exemplary embodiment of the present invention.

FIG. 3 is a cross-sectional view illustrating a display device in accordance an exemplary embodiment of the present invention.

Referring to FIG. 3, the display panel 200 includes a first transparent substrate 205, a first touch panel 225, a display panel 230, a second touch panel 255, a second transparent substrate 260, etc. The first touch panel 225 may include a first adhesion layer 210, a first polarization member 215, and a plurality of first sensing patterns 220. The second touch panel 255 may include a base substrate 235, a plurality of second sensing patterns 240, a second polarization member 245, and a second adhesion layer 250.

As illustrated in FIG. 3, the first sensing patterns 220 of the first touch panel 225 may be directly disposed on a bottom face of the display panel 230. That is, the first touch panel 225 may not include a base substrate. Further, the second sensing patterns 240 may be directly disposed an upper face of a base substrate 235. Thus, the display device 200 may be thinner and lighter.

Figure 4:
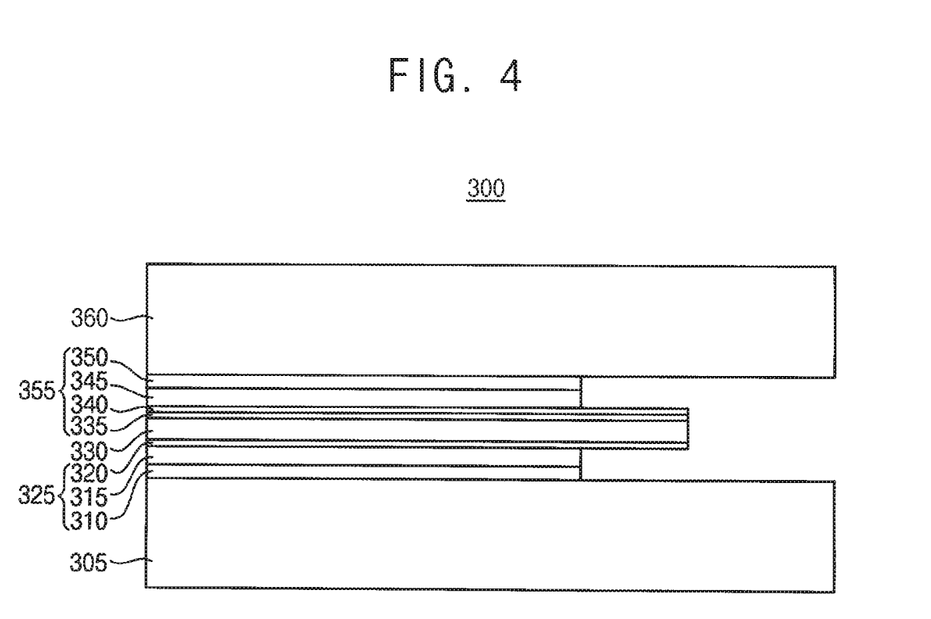
FIG. 4 is a cross-sectional view illustrating a display device in accordance with an exemplary embodiment of the present invention.

FIG. 4 is a cross-sectional view illustrating a display device in accordance with exemplary embodiments of the present invention.

Referring to FIG. 4, the display device 300 may include a first transparent substrate 305, a first touch panel 325, a display panel 330, a second touch panel 355, and a second transparent substrate 360. The first touch panel 325 may include a first adhesion layer 310, a first polarization member 315, and a plurality of first sensing patterns 320. The second touch panel 355 may include a plurality of second sensing patterns 335, a base substrate 340, a second polarization member 345, and a second adhesion layer 350.

As illustrated in FIG. 4, the first touch panel 325 may be disposed on the first transparent substrate 305. The first sensing patterns 320 may be directly disposed on a bottom face of the display panel 330. In exemplary embodiments, the display panel 330 may support as the first sensing patterns 320 and the second sensing patterns 335. Thus, an additional substrate for the first touch panel 325 may not be required. As a result, the display device 300 may be thinner and lighter.

The second touch panel 355 may be positioned on the display panel 330. The second sensing patterns 335 of the second touch panel 355 may be directly disposed on an upper face of the display panel 330. That is, the display panel 330 may support the second sensing patterns 335.

The base substrate 340 of the second touch panel 355 may be disposed on the second sensing patterns 335. The base substrate 340 may protect the display panel 330 from an external impact. As described above, the first and the second sensing patterns 320 and 335 may be directly disposed on the bottom face of and the upper face of the display panel 330, respectively. Therefore, touch coordinates input by input means may be detected through the first and the second touch panels 325 and 355, to reduce the thickness and weight of the display device 300.

Figure 5:
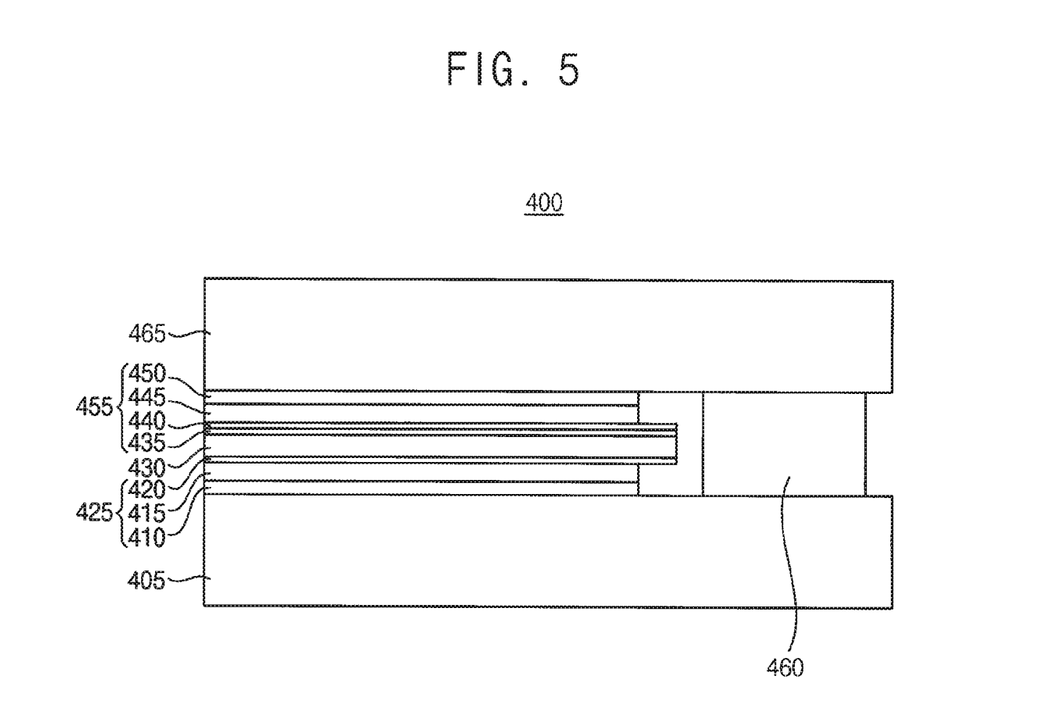
FIG. 5 is a cross-sectional view illustrating a display device in accordance with an exemplary embodiment of the present invention.

FIG. 5 is a cross-sectional view illustrating a display device in accordance with exemplary embodiments of the present invention.

Referring to FIG. 5, the display device 400 may include a first transparent substrate 405, a first touch panel 425, a display panel 430, a second touch panel 455, and a second transparent substrate 465. The first touch panel 425 may include a first adhesion layer 410, a first polarization member 415, and a plurality of first sensing patterns 420. The second touch panel 455 may include a plurality of second sensing patterns 435, a base substrate 440, a second polarization member 445, and a second adhesion layer 450.

As illustrated in FIG. 5, a buffer member 460 may be disposed between the first transparent substrate 405 and the second transparent substrate 465. The buffer member 460 may be located near the outermost portions of the first and the second transparent substrates 405 and 465 to effectively reduce shock from external impact. Further, impurities may not enter a space between the first transparent substrate 405 and the second transparent substrate 465 because of the buffer member 460. For example, the buffer member 460 may include polymethylmethacrylate (PMMA), polycarbonate (PC), polyethyleneterephthalate (PET), triacetylcellulose (TAC), polyethylenesulfone, etc. These may be used alone or in a mixture thereof. Thus, the display panel 430 in FIG. 5 may be protected by the first and the second adhesion layers 410 and 450, and also the buffer member 460.

FIGS. 6-10 are cross-sectional views illustrating a method of manufacturing a display device in accordance with exemplary embodiments of the present invention.

Figure 6:
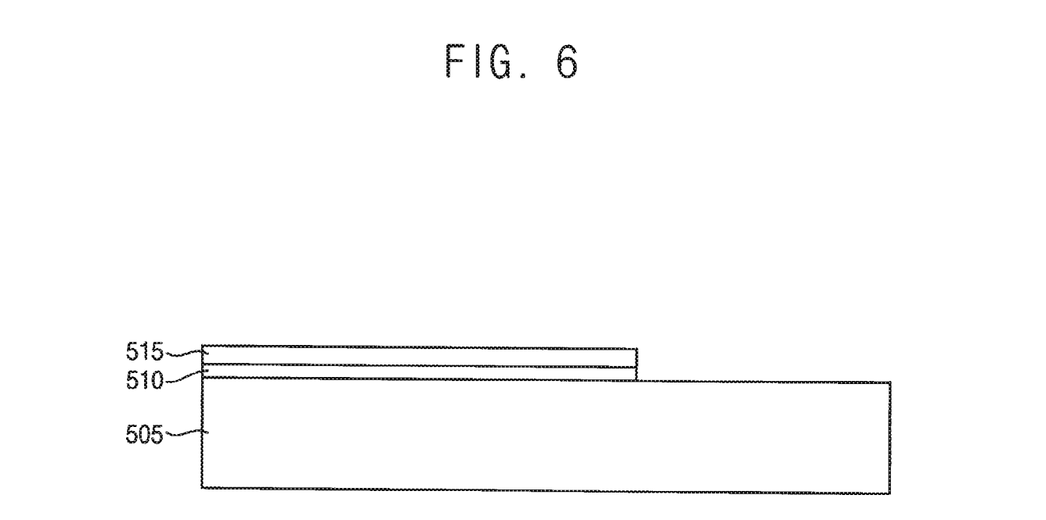
FIGS. 6 to 10 are cross-sectional views illustrating a method of manufacturing a display device in accordance with exemplary embodiments of the present invention.

Referring to FIG. 6, a first adhesion layer 510 may be formed on a first transparent substrate 515. The first adhesion layer 510 may be formed using a transparent optical clear adhesive, a transparent optical clear resin, etc. The first adhesion layer 510 may serve as a buffer layer without substantially reducing a transmittance of the display device because the first adhesion layer 510 may have a high transmittance. A first polarization member 515 may be formed on the first adhesion layer 510.

Figure 7:
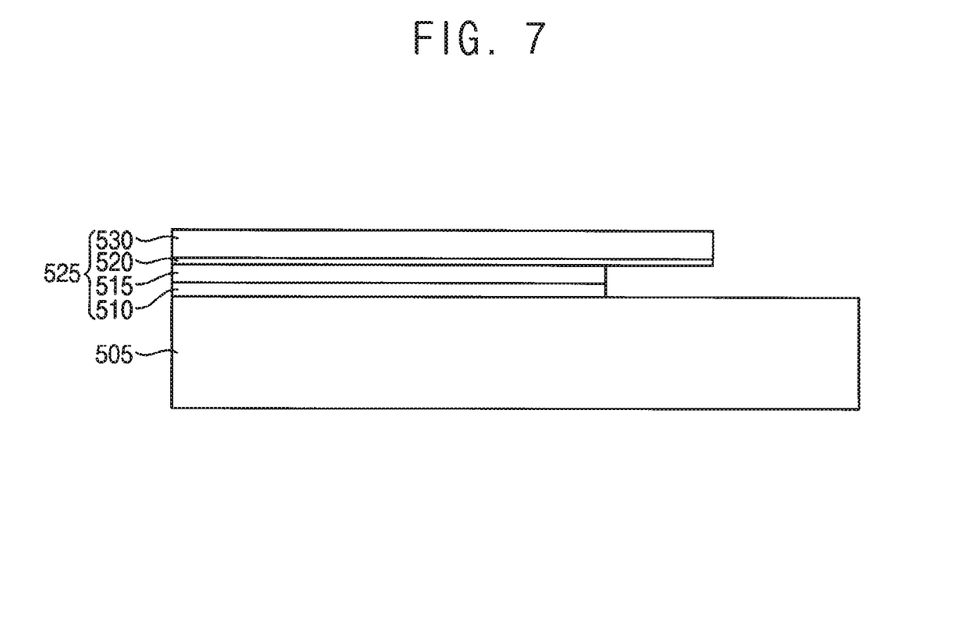

Referring to FIG. 7, a first base substrate 530 may be formed on the first polarization member 515. Then, a plurality of first sensing patterns 520 may be formed on a bottom face of the first base substrate 530. In exemplary embodiments, a first transparent conductive layer (not illustrated) may be formed on the bottom face of the first base substrate 530, and then the first transparent conductive layer may be etched to form the first sensing patterns 520 on the bottom face of the first base substrate 530. For example, the first transparent conductive layer may be formed using indium tin oxide, zinc tin oxide, gallium oxide, indium zinc oxide, zinc oxide, etc. In addition, the first transparent conductive layer may be formed by a sputtering process, a plating process, a pulse laser deposition process, a vapor deposition process, a printing process, etc. Thus, a first touch panel 525, including the first base substrate 530, the first sensing patterns 520, the first polarization member 515, and the first adhesion layer 510 may be provided on the first transparent substrate 505.

Figure 8:
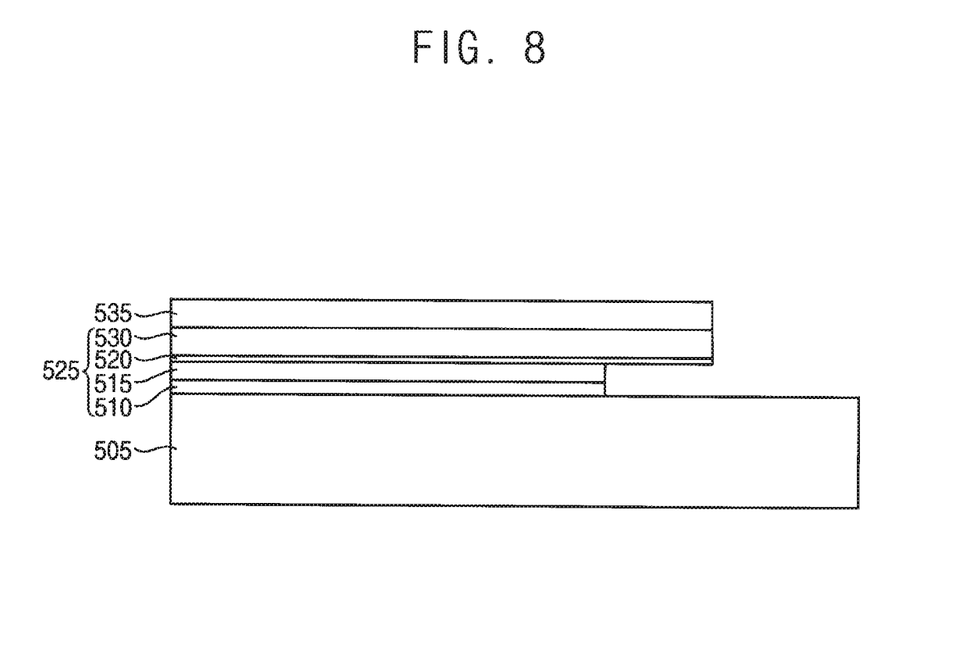

Referring to FIG. 8, a display panel 535 may be formed on the first base substrate 530. The display panel 535 may include an insulation substrate (not illustrated), semiconductor devices (not illustrated), display structures (not illustrated), peripheral circuits (not illustrated), and/or other structures, as would be appreciated by one having skill in the art.

Figure 9:
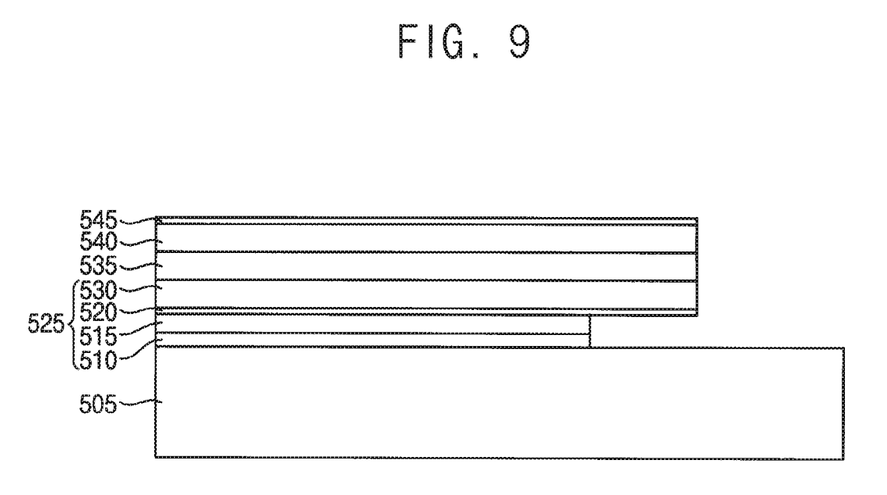

Referring to FIG. 9, a second base substrate 540 may be formed on the display panel 535. In exemplary embodiments, a second transparent conductive layer (not illustrated) may be formed on an upper face of the second base substrate 540, and then the second transparent conductive layer may be etched to form a plurality of second sensing patterns 545 on the upper face of the second base substrate 540. The second transparent conductive layer may include a material substantially the same as that of the first transparent conductive layer. Additionally, the second transparent conductive layer may be obtained by a process substantially the same as that of forming the first transparent conductive layer.

Figure 10:
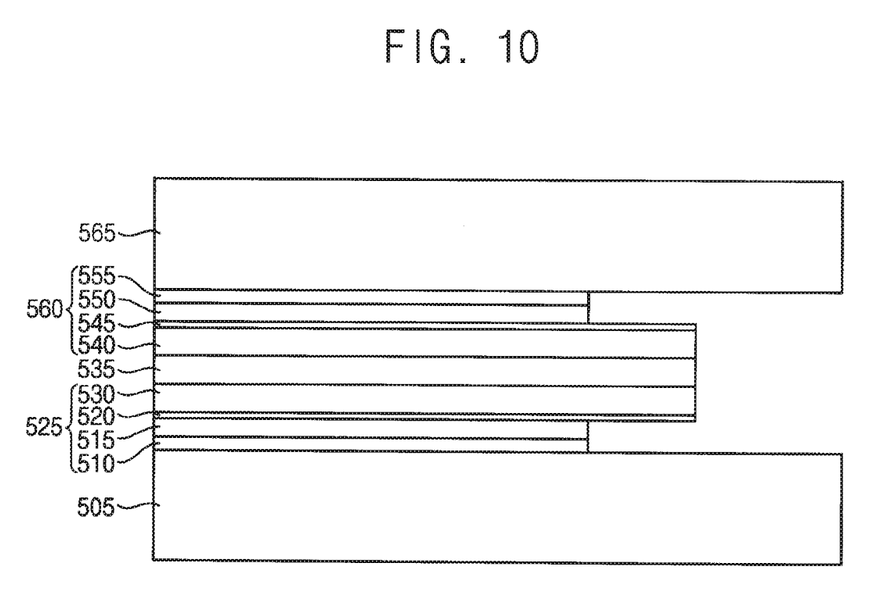

Referring to FIG. 10, a second polarization member 550 may be formed on the second base substrate 540, and then a second adhesion layer 555 may be formed on the second polarization member 550. Thus, a second touch panel 560 including the second base substrate 540, the second sensing patterns 545, the second polarization member 550, and the second adhesion layer 555 may be provided on the display panel 535. A second transparent substrate 565 may be formed on the second touch panel 560. The second transparent substrate 565 may be substantially opposed to the first transparent substrate 505. The second transparent substrate 565 may be formed using a material having a relatively high strength and/or flexibility.

In exemplary embodiments, the second touch panel 560 disposed on the upper face of the display panel 535 may detect a touch by a user using his hand or a conductive object. Additionally, the first touch panel 525 disposed on the bottom face of the display panel 535 may detect a touch by the user in the same manner as the second touch panel 560. Therefore, the display device may operate as a double sided touch display device without substantially increasing characteristics such as thickness and weight. Moreover, since the components of the display device may have high transmittances, the display device according to exemplary embodiments may serve as a transparent display device.

As described above, the first touch panel 525 and the second touch panel 560 may be formed on the bottom face of the display panel 535 and the upper face the display panel 535, respectively. Thus, an additional process for attaching an external touch panel to the display panel 535 may not be required, so a manufacturing cost of the display device may be reduced, and also manufacturing processes for the display device may be simplified. As a result, the display device may be manufactured with a high efficiency and a high yield.

Exemplary embodiments of the present invention may be employed in any electronic apparatus including a display device. For example, the display device according to exemplary embodiments may be used in a refrigerator, a smart window, a display device for an automobile, a ship or an aircraft, a transparent tablet, a heads-up display device, a medical display device, a wearable display device, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A display device comprising:
a first transparent substrate;
a second transparent substrate disposed opposite to the first transparent substrate;
a display panel disposed between the first transparent substrate and the second transparent substrate and configured to display an image through each of the first transparent substrate and second transparent substrate;
a first touch panel disposed on a bottom face of the display panel and between the first and second transparent substrates; and
a second touch panel disposed on an upper face of the display panel and between the first and second transparent substrates,
wherein the first touch panel comprises:
first sensing patterns disposed directly on the bottom face of the display panel;
a first polarization member disposed on a bottom face of the first sensing patterns; and
a first adhesion layer disposed between the first polarization member and the first transparent substrate, and
wherein the second touch panel comprises:
second sensing patterns disposed directly on the upper face of the display panel;
a base substrate disposed on an upper face of the second sensing patterns;
a second polarization member disposed on an upper face of the base substrate; and
a second adhesion layer disposed between the second polarization member and the second transparent substrate.

2. The display device of claim 1, further comprising:
a buffer member disposed between the first transparent substrate and the second transparent substrate.

3. The display device of claim 2, wherein the buffer member comprises at least one of polymethylmethacrylate (PMMA), polycarbonate (PC), polyethyleneterephthalate (PET), triacetylcellulose (TAC), and polyethylenesulfone.

4. A display device comprising:
a first transparent substrate;
a second transparent substrate disposed opposite to the first transparent substrate;
a display panel disposed between the first transparent substrate and the second transparent substrate and configured to display an image through each of the first transparent substrate and second transparent substrate;
a first touch panel disposed on a bottom face of the display panel and between the first and second transparent substrates; and
a second touch panel disposed on an upper face of the display panel and between the first and second transparent substrates,
wherein the first touch panel comprises:
first sensing patterns disposed directly on the bottom face of the display panel;
a first polarization member disposed on a bottom face of the first sensing patterns; and
a first adhesion layer disposed between the first polarization member and the first transparent substrate, and
wherein the second touch panel comprises:
a base substrate disposed on the upper face of the display panel;
second sensing patterns disposed directly on an upper face of the base substrate;
a second polarization member disposed on an upper face of the second sensing patterns; and
a second adhesion layer disposed between the second polarization member and the second transparent substrate.

5. A method of manufacturing a display device, comprising:
forming a display panel on a first transparent substrate;
forming a first touch panel on a bottom face of the display panel;
forming a second touch panel on an upper face of the display panel; and
forming a second transparent substrate on the second touch panel,
wherein forming the first touch panel comprises:
forming first sensing patterns directly on the bottom face of the display panel;
forming a first polarization member on a bottom face of the first sensing patterns; and
forming a first adhesion layer between the first polarization member and the first transparent substrate,
wherein forming the second touch panel comprises:
forming second sensing patterns directly on the upper face of the display panel;
forming a base substrate on second sensing patterns;
forming a second polarization member on the base substrate; and
forming a second adhesion layer on the second polarization member,
wherein the first touch panel and the second touch panel are formed between the first and second transparent substrates, and
wherein the display panel is configured to display an image through each of the first transparent substrate and second transparent substrate.

6. The method of claim 5, further comprising:
forming a buffer member between the first transparent substrate and the second transparent substrate.

7. The method of claim 6, wherein the buffer member comprises at least one of polymethylmethacrylate (PMMA), polycarbonate (PC), polyethyleneterephthalate (PET), triacetylcellulose (TAC), and polyethylenesulfone.

8. A method of manufacturing a display device, comprising:
- forming a display panel on a first transparent substrate;
- forming a first touch panel on a bottom face of the display panel;
- forming a second touch panel on an upper face of the display panel; and
- forming a second transparent substrate on the second touch panel,
- wherein forming the first touch panel comprises:
  - forming first sensing patterns directly on the bottom face of the display panel;
  - forming a first polarization member on a bottom face of the first sensing patterns; and
  - forming a first adhesion layer between the first polarization member and the first transparent substrate,
- wherein forming the second touch panel comprises:
  - forming a base substrate on the upper face of the display panel;
  - forming second sensing patterns directly on an upper face of the base substrate;
  - forming a second polarization member on an upper face of the second sensing patterns; and
  - forming a second adhesion layer between the second polarization member and the transparent substrate,
- wherein the first touch panel and the second touch panel are formed between the first and second transparent substrates, and
- wherein the display panel is configured to display an image through each of the first transparent substrate and second transparent substrate.

* * * * *